May 3, 1927.
H. E. BRACH
SOLDERING IRON
Filed Feb. 20, 1922
1,626,911
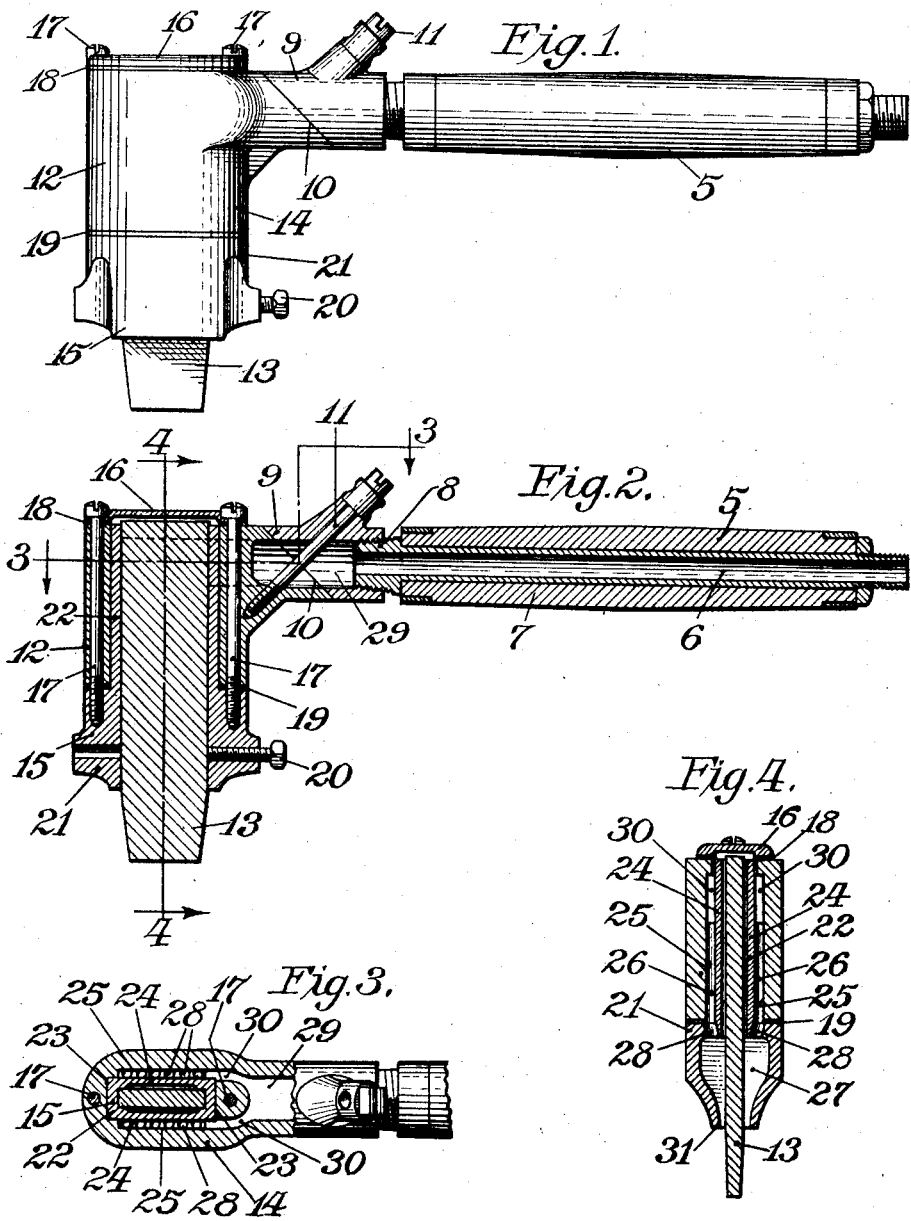
Inventor:
Henry F. Bruch
By Fisher Towle Clapp & Soans
Attys.

Patented May 3, 1927.

1,626,911

UNITED STATES PATENT OFFICE.

HENRY E. BRACH, OF VALPARAISO, INDIANA; FRANCES BRACH ADMINISTRATRIX OF SAID HENRY E. BRACH, DECEASED.

SOLDERING IRON.

Application filed February 20, 1922. Serial No. 537,758.

This invention relates to soldering irons but more particularly those of the self-heating type and has for its primary object to provide a device which is simple and durable in construction and economical and efficient in operation.

Further objects of my invention are to provide a soldering iron in which the soldering element is maintained at a uniform temperature by the combustion of liquid or gaseous fuel, to permit the adjustment or replacement of the soldering element, to facilitate the use of iron, and in general to provide a new and improved soldering iron.

The many other objects and advantages of the invention will be better understood by reference to the following specification when considered in connection with the accompanying drawing illustrating a selected embodiment thereof, in which:—

Fig. 1 is a side elevation of a soldering iron embodying my invention.

Fig. 2 is a central longitudinal section, and

Figs. 3 and 4 are respectively sections on the line 3—3 and 4—4 of Fig. 2.

Referring to the drawing, the soldering iron is provided with a handle 5 through which the fuel pipe 6 passes. This pipe is adapted to be connected to a source of fuel supply by flexible tubing. The grip 7 is preferably made of wood or other material suitable for the purpose. The forward end 8 of the pipe 6 is externally threaded to fit within the threaded shank 9 of the iron. This shank is preferably jointed at 10. A miter joint is advantageous as it permits the soldering element to be set parallel with the axis of the handle or at a right angle thereto. The parts of the shank are connected by a screw 11 set at a right angle to the joint and forming the axis of revolution of the parts.

The outer or operating portion of the soldering iron consists of a holder 12 and a soldering element 13. The holder 12 comprises a casing 14, a heating element 15, a cap 16, and screws 17 connecting these parts. Gaskets 18 and 19 are preferably provided. The soldering element 13 consists of a bar or elongated plate of suitable metal fitting within the heating element 15 and adapted to be held in any adjusted position therein by the set screw 20.

The heating element 15 comprises a head 21 and a shank 22. The shank fits in grooves 23 in the casing 14 and its side walls 24 are spaced from the opposing walls 25 of the casing to form fuel passages 26. These passages communicate with the combustion chamber 27 in the head 21 through a plurality of small passages 28 in the heating member at the junction of the head and shank. The shank 9 is provided with a fuel passage 29 which divides as it enters the casing, one branch 30 communicating with each of the passages 26. Sufficient space is left between the soldering element 13 and the mouth 31 of the head to permit the escape of the products of combustion.

The long screws 17 bind together the cap 16, the casing 14 and the heating element 15. The gaskets 18 and 19 form gas tight joints between these parts.

In the drawing the soldering iron is illustrated with the handle disposed at a right angle to the soldering bar. To bring these parts in parallel relation the screw 11 is slightly loosened, and, with this screw acting as the axis, the parts are relatively rotated through an angle of 180°. The screw is then tightened to bind the two parts of the shank 9 in their new position.

In the operation of the soldering iron the fuel enters through the pipe 6 and is conducted to the passages 26 on opposite sides of the soldering element 13 by the divided passages 30. From thence it passes to the chamber 27 through the perforations 28 and combustion takes place about the soldering element 13. The air and gas are preferably mixed in proper proportions before reaching the soldering iron. The products of combustion pass out through the mouth 31 of the heating element. The amount of heat applied to the soldering element may be regulated in the usual manner. In case insufficient air is provided to secure complete combustion of the fuel in the chamber 27, this will be obtained at the mouth of the heating element.

It will be readily evident that with my improved soldering iron the soldering element may be maintained at a uniform temperature at an exceedingly low cost and this temperature may be regulated far more effectively than is possible with electricity. The soldering element is adjustable in the holder to compensate for wear and a new element may be substituted when needed. This element may be positioned parallel with or at a right angle to the handle. The parts may be readily disassembled and easily cleaned.

I am aware that numerous changes may be made in the form and arrangement of parts without departing from the spirit of my invention, and I reserve the right to make all such as fairly fall within the scope of the following claims.

I claim as my invention:

1. In a device of the class described, an open-ended holder comprising a casing, a handle connected to the side wall of said casing, a heating element insertable into one end of said casing, a cap forming a closure for the other end of said casing, and means for securing said casing, said element and said cap together, a soldering element insertable in said heating element, and means for securing said soldering element in said heating element in any adjusted position.

2. In a device of the class described, an open-ended holder comprising a casing, a handle on said casing, a heating element having a shank slidably fitting within one end of said casing and a shoulder abutting said end, a cap forming a closure for the opposite end of said casing, and fastening members connecting said cap, said casing, and said element, a soldering element insertable into the end of said heating element, and means for securing said elements together in any adjusted position.

3. In a device of the class described, an open-ended holder comprising a casing, a handle on said casing, a heating element having a shank slidably fitting within one end of said casing and a shoulder abutting said end, a gasket between the end of said casing and said shoulder, a cap forming a closure for the opposite end of said casing, and fastening members connecting said cap, said casing, and said heating element, a soldering element slidably fitting within a socket in the end of said heating element, and means for securing said elements together in any adjusted position.

4. In a soldering iron, the combination of a handle, a casing carried by said handle; a heating element having a shank adapted to be seated in said casing and provided with a socket at its inner end, a fuel passageway, and a combustion chamber adjacent its outer end; a soldering member seated in said socket and having an operative end projecting beyond said outer end, said socket permitting said soldering member to be positioned with its operative portion relatively near the combustion chamber.

HENRY E. BRACH.